US012601466B1

(12) United States Patent
Chang

(10) Patent No.: US 12,601,466 B1
(45) Date of Patent: Apr. 14, 2026

(54) LIGHTING FIXTURE WITH A LEVITATION FUNCTION

(71) Applicant: Guangzhou Jiaheng Arts & Crafts Co., Ltd, Guangdong (CN)

(72) Inventor: Jiang Chang, Guangdong (CN)

(73) Assignee: Guangzhou Jiaheng Arts & Crafts Co., Ltd, Guangdong (CN)

( * ) Notice: Subject to any disclaimer, the term of this patent is extended or adjusted under 35 U.S.C. 154(b) by 0 days.

(21) Appl. No.: 19/287,264

(22) Filed: Jul. 31, 2025

(51) Int. Cl.

| | |
|---|---|
| ***F21V 19/00*** | (2006.01) |
| ***F21V 23/02*** | (2006.01) |
| ***F21V 23/06*** | (2006.01) |
| *F21V 15/01* | (2006.01) |

(52) U.S. Cl.
CPC ........ *F21V 19/0035* (2013.01); *F21V 23/023* (2013.01); *F21V 23/06* (2013.01); *F21V 15/01* (2013.01)

(58) Field of Classification Search
CPC .... F21V 19/0035; F21V 23/023; F21V 23/06; F21V 15/01; F21V 21/096; F21V 21/0965; F21V 19/003; F21V 23/00; F21V 33/00; F21V 21/00; F21V 19/00
See application file for complete search history.

(56) References Cited

U.S. PATENT DOCUMENTS

| | | | | |
|---|---|---|---|---|
| 2011/0248807 | A1* | 10/2011 | Wang | F21S 6/002 335/296 |
| 2022/0014121 | A1* | 1/2022 | Chargueraud | F21V 33/0048 |
| 2023/0001036 | A1* | 1/2023 | Chang | A61L 9/03 |

* cited by examiner

*Primary Examiner* — Bao Q Truong
(74) *Attorney, Agent, or Firm* — Hawaii Patent Services; Nathaniel K. Fedde; Kenton N. Fedde

(57) ABSTRACT

The present disclosure relates to a lighting fixture with a levitation function, comprising: a housing, inside which a power supply module is provided, the power supply module comprising a magnetic field generating unit and a wireless power supply transmitting unit; a lamp holder, inside which a lighting module is provided, the lighting module comprising a magnetic field responding unit, a wireless power supply receiving unit, and a light emitting unit; wherein the magnetic field generating unit comprises at least one electromagnetic coil and at least one first magnet, and the magnetic field responding unit comprises at least one second magnet.

17 Claims, 7 Drawing Sheets

LIGHTING FIXTURE WITH A LEVITATION FUNCTION

TECHNICAL FIELD

The present disclosure relates to the technical field of lighting fixtures, particularly to a lighting fixture with a levitation function.

BACKGROUND

Traditional decorative candles primarily rely on open flame combustion or fixed electronic light sources for illumination, which have significant drawbacks. Firstly, the open flame method not only poses a fire hazard but also the high-temperature molten wax can cause burns. Secondly, while existing electronic candles avoid the risk of open flames, their fixed structures cannot achieve dynamic levitation effects, greatly diminishing their decorative appeal. Furthermore, some levitating lighting fixtures require physical wiring for power supply, which not only compromises visual aesthetics but also restricts the freedom of movement of the levitating body; whereas battery-powered solutions face issues such as frequent battery replacements and increased maintenance costs.

For example, the imitation candle lamp disclosed in U.S. Pat. No. 10,253,935B2 has its driving device placed inside the lamp head and connected to a power source, which can drive the simulated flame to swing and use the deformation of an elastic shaft to generate elastic force for mimicking the reverse swing of the flame. However, this design still fails to achieve a dynamic levitation effect and requires physical wiring for power supply, unable to simulate the subtle, random, and natural positional shifts or morphological changes (such as slight flickering of the flame or the delicate tilting tendency of the candle body due to uneven heating) caused by factors like heat convection, air flow, or wax softening during the burning process of a real candle. This makes electronic candles visually lack the organic feel and dynamic beauty of a real burning candle.

SUMMARY

The present disclosure provides a lamp with a levitation function to address the issues raised in the background.

A lamp with a levitation function, comprising: a housing internally equipped with a power supply module, the power supply module comprising a magnetic field generating unit and a wireless power supply transmitting unit; and a lamp holder internally equipped with a lighting module, the lighting module comprising a magnetic field responding unit, a wireless power supply receiving unit and a light emitting unit. The magnetic field generating unit comprises at least one electromagnetic coil and at least one first magnet, and the magnetic field responding unit comprises at least one second magnet; when the electromagnetic coils are energized, a magnetic field is generated to provides a repulsive force to the second magnet, and the first magnet and the second magnet have opposite magnetic poles, providing an attractive force, thereby enabling the lamp holder to levitate above the housing and maintain balance. The wireless power supply transmitting unit comprises a wireless power supply coil, the wireless power supply receiving unit comprises a wireless receiving coil, and the wireless power supply coil and the wireless receiving coil are coupled through electromagnetic induction to supply power to the light emitting unit.

A lamp with a levitation function comprises a housing internally equipped with a power supply module, the power supply module comprising a magnetic field generating unit and a wireless power supply transmitting unit; and a lamp holder internally equipped with a lighting module, the lighting module comprising a magnetic field responding unit, a wireless power supply receiving unit and a light emitting unit. The magnetic field generating unit comprises at least one electromagnetic coil and at least one first magnet, and the magnetic field responding unit comprises at least one second magnet; when the electromagnetic coils are energized, a magnetic field is generated to provide a repulsive force to the second magnet, and the first magnet and the second magnet have opposite magnetic poles to provide an attractive force, thereby enabling the lamp holder to levitate above the housing and maintain balance. The the wireless power supply transmitting unit and the wireless power supply receiving unit are coupled through electromagnetic induction to supply power to the light emitting unit.

A lighting fixture with a levitation function comprises a housing, inside which a levitation driving unit and a wireless power supply transmitting unit; and a levitating body internally equipped with a levitation responding unit, a wireless power supply receiving unit, and a light emitting unit. The levitation driving unit and the levitation responding unit interact magnetically to generate a levitation force, enabling the levitating body to stably levitate above the housing; the wireless power supply transmitting unit and the wireless power supply receiving unit are coupled through electromagnetic induction to supply power to the light emitting unit.

To achieve the above inventive objective, the present disclosure adopts the following technical solution:

When the DC plug is connected to an external power source, the PCBA control board supplies current to the electromagnetic coil, driving it to generate a magnetic field. The magnetic field provides a repulsive force to the second magnet, positioning it above the housing. Simultaneously, due to the opposite magnetic poles of the first magnet and the second magnet, the first magnet attracts the second magnet downward, maintaining the balance of the lamp holder and allowing it to stably levitate above the housing. Additionally, when the wireless power supply coil is energized, it generates a strong magnetic field, inducing a current in the wireless receiving coil, which powers the LED light panel, causing it to emit light.

BRIEF DESCRIPTION OF DRAWINGS

The drawings, which form part of this application, are intended to provide further understanding of the present disclosure. The illustrative embodiments and the descriptions thereof are for explaining the present disclosure and do not constitute undue limitations. In the drawings.

Figure 1:
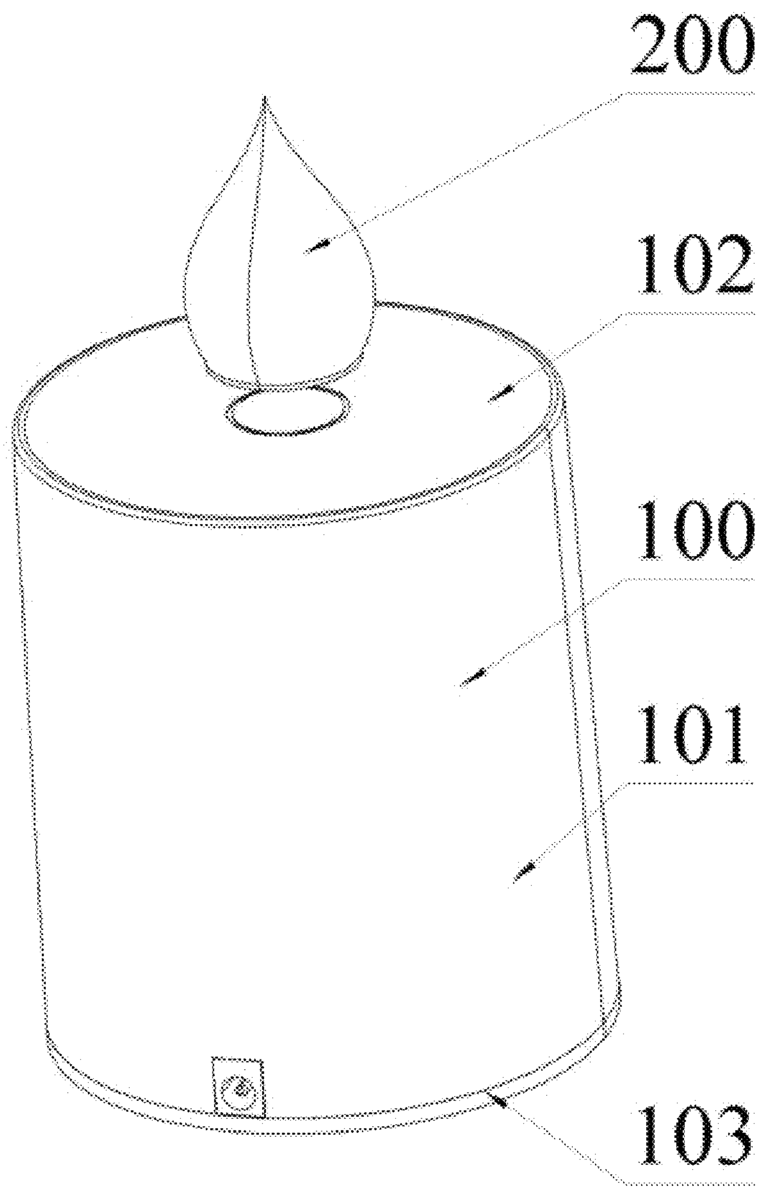
FIG. 1 is a perspective schematic diagram of an embodiment provided by the present disclosure.

Reference signs: Housing (100); Outer shell (101); Top cover (102); Base plate (103); Connecting plate (104); Mounting groove (105); Lamp holder (200); Lamp shell (201); Lamp base (202); Lighting module (300); Second magnet (301); Wireless receiving coil (302); LED light panel (303); Power supply module (400); Electromagnetic coil (401); First magnet (402); Wireless power supply coil (403); PCBA control board (404); DC plug (500).

DESCRIPTION OF EMBODIMENTS

The technical solution in the embodiment of the present disclosure will be clearly and completely described below with reference to the drawings. Obviously, the described embodiment is part of, rather than all of the embodiments of the present disclosure. The following description of at least one exemplary embodiment is illustrative in nature and is in no way intended to limit the present disclosure, its application or uses. Based on the embodiments in the present disclosure, all other embodiments obtained by those skilled in the art without creative work belong to the scope of protection of the present disclosure.

It should be noted that the terminology used here is only for describing specific embodiments, and is not intended to limit exemplary embodiments according to the present application. As used herein, the singular form is also intended to include the plural form unless the context clearly indicates otherwise. Furthermore, it should be appreciated that when the terms "comprising" and/or "including" are used in this specification, they specify the presence of features, steps, operations, devices, components and/or combinations thereof.

Unless otherwise specified, the relative arrangement of components and steps, numerical expressions and numerical values set forth in these embodiments do not limit the scope of the present disclosure. At the same time, it should be appreciated that for the convenience of description, the dimensions of various parts shown in the drawings are not drawn according to the actual scale relationship. Techniques, methods and equipment known to those skilled in the art may not be discussed in detail, but in appropriate cases, they should be regarded as part of the authorization specification. In all the examples shown and discussed herein, any specific values should be interpreted as illustrative, and not as limiting. Therefore, other examples of exemplary embodiments may have different values. It should be noted that similar numbers and letters indicate similar items in the following drawings, therefore once an item is defined in one drawing, it does not need to be further discussed in subsequent drawings.

Figure 2:
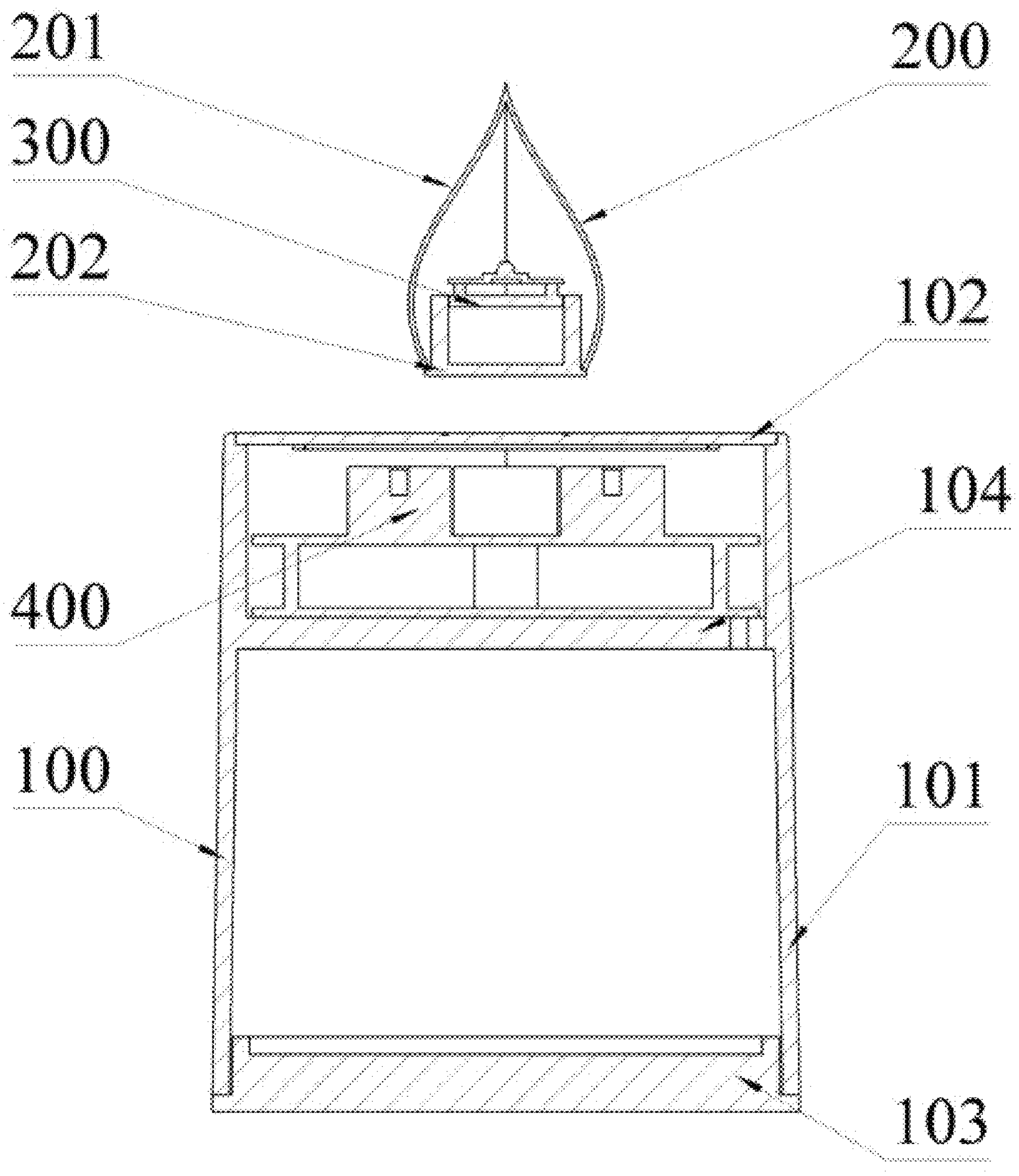
FIG. 2 is a cross-sectional structural schematic diagram of the embodiment in FIG. 1.
Figure 4:
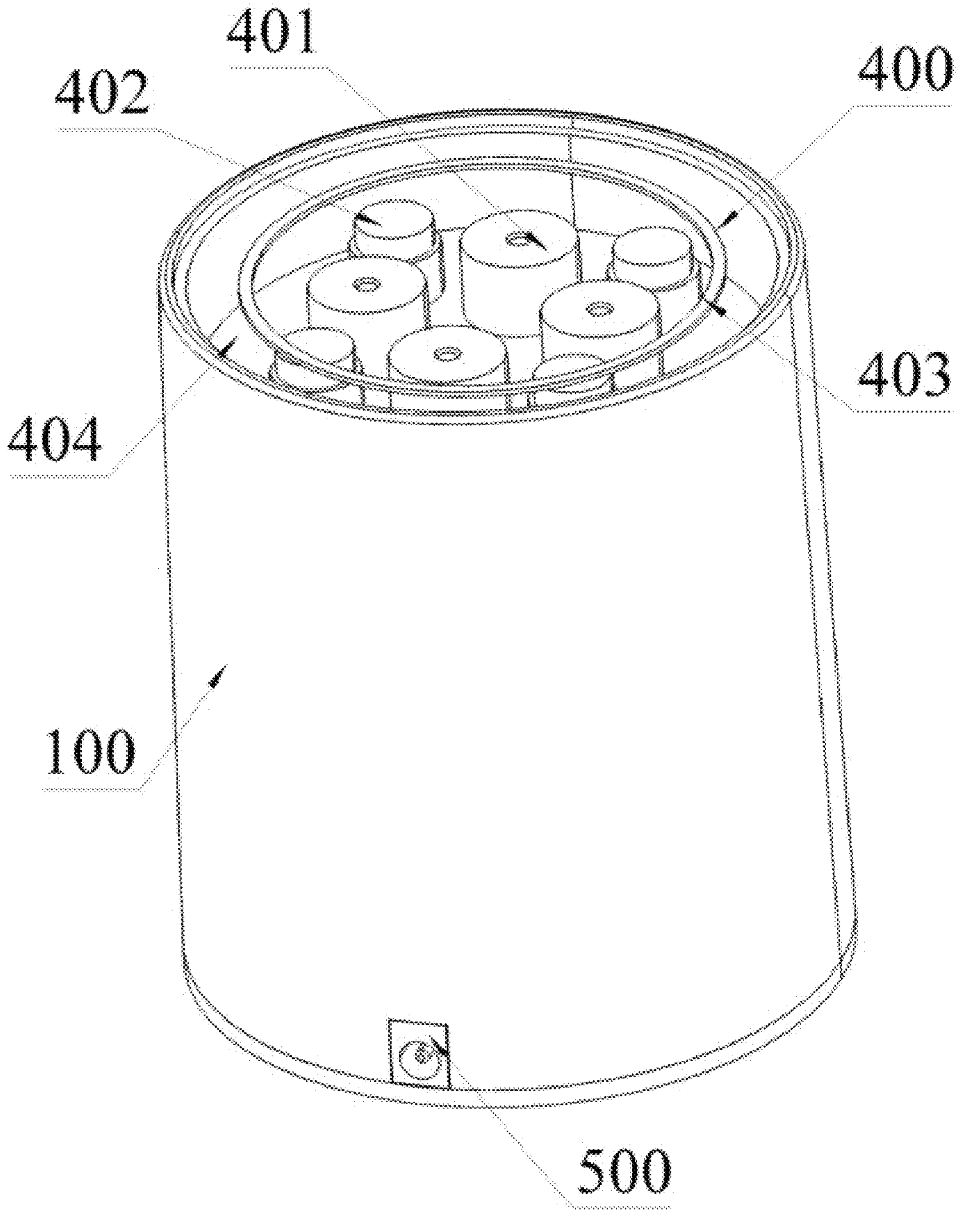
FIG. 4 is a structural schematic diagram of the power supply module in FIG. 2.

As shown in FIGS. 1, 2, and 4, a lighting fixture with a levitation function includes a housing 100 and a lamp holder 200 levitating thereabove. The maximum outer diameter of the lamp holder 200 is smaller than the outer diameter of the housing 100. The housing 100 contains a power supply module 400 and a DC plug 500, while the lamp holder 200 houses a lighting module 300. The power supply module 400 wirelessly transmits power to the lighting module 300 through electromagnetic induction, and the power supply module 400 cooperates with the lighting module 300 to keep the lamp holder 200 levitating above the housing 100.

As shown in FIGS. 1, 2, 3, 4, and 6, the housing 100 consists of a cylindrical outer shell 101, a top cover 102 embedded at the top, and a detachable base plate 103 at the bottom, forming a sealed cavity. A connecting plate 104 is horizontally arranged inside the cavity and fixed to the inner wall of the outer shell 101. The base plate 103 is provided with a mounting groove 105 for installing a DC plug 500, which is connected to an external power source to supply energy to the power supply module 400. The lamp holder 200 includes a hollow lamp shell 201 and a lamp base 202, which are connected through a snap-fit to form a water droplet-shaped levitating body.

In other embodiments (not shown), a flexible silicone buffer ring is arranged around the edge of the top cover 102 of the housing 100, with a height slightly lower than the levitation balance height. If the levitating body deviates significantly from its balanced position due to external forces (e.g., collision), it will first contact the buffer ring, avoiding hard impacts with the table or direct falls.

Figure 5:
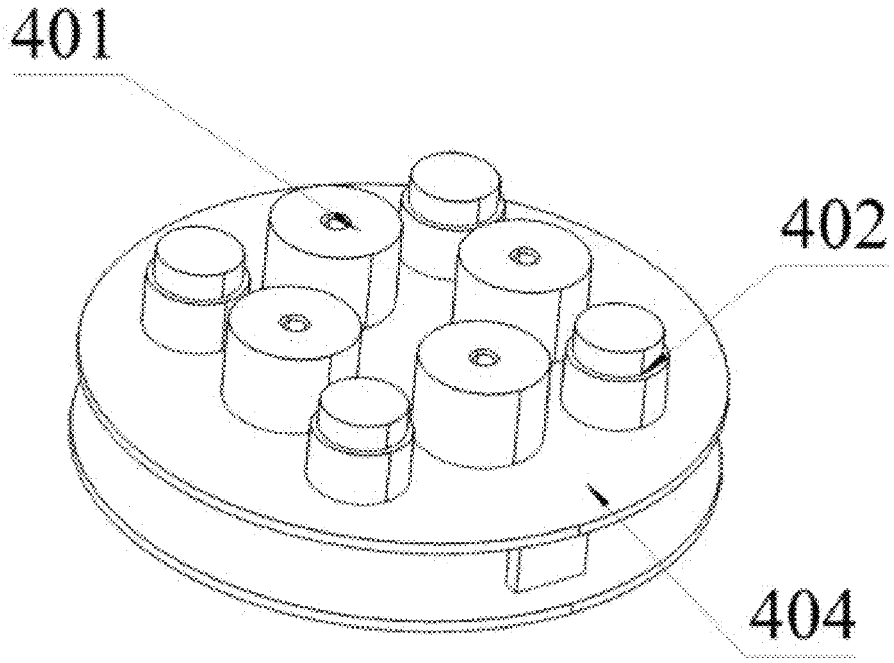
FIG. 5 is a perspective schematic diagram of the electromagnetic coil, first magnet, and PCBA control board in FIG. 4.
Figure 6:
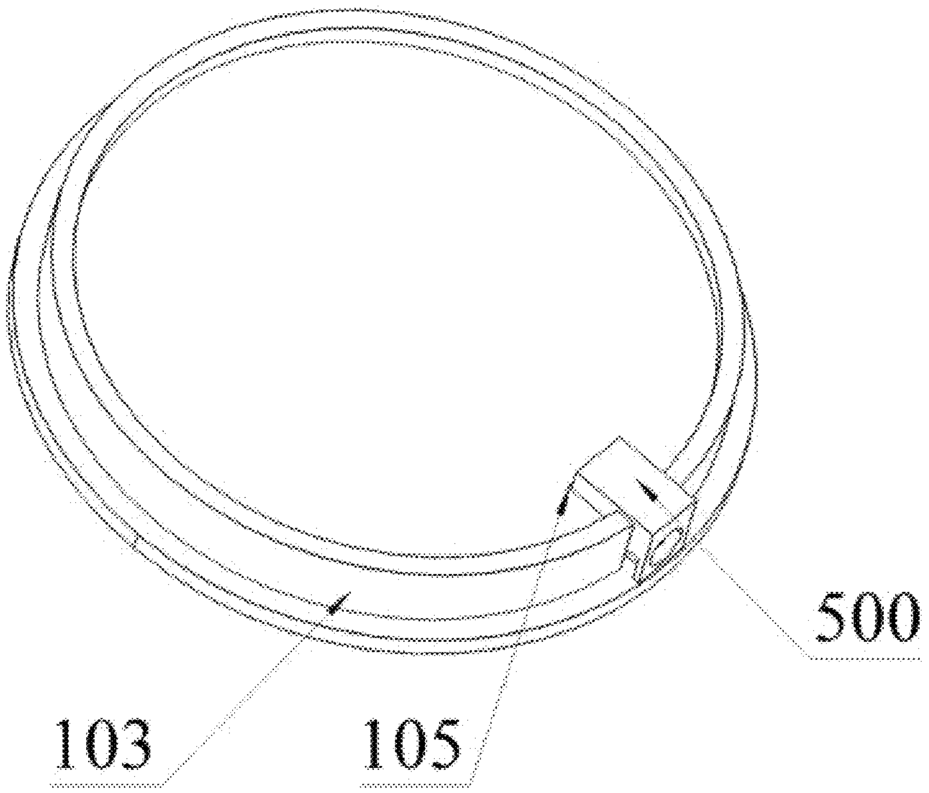
FIG. 6 is a connection schematic diagram of the mounting groove and DC plug in FIG. 4.
Figure 7:
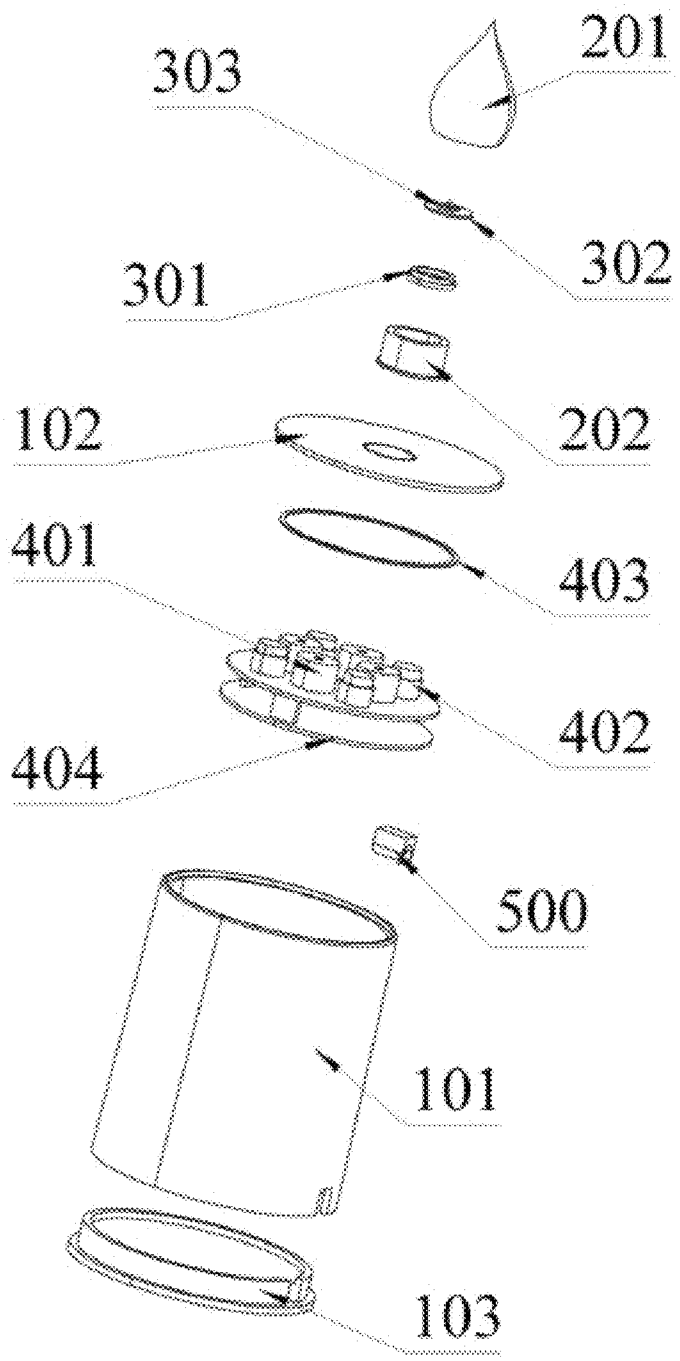
FIG. 7 is an exploded structural schematic diagram of FIG. 1.

As shown in FIGS. 4, 5, and 7, the power supply module 400 includes electromagnetic coils 401, first magnets 402, a wireless power supply coil 403, and a PCBA in control board 404. The PCBA control board 404 is mounted on the connecting plate 104, multiple electromagnetic coils 401 and first magnets 402 are uniformly arranged on the PCBA control board 404. The wireless power supply coil 403 is positioned at the bottom of the top cover 102. The DC plug 500 is electrically connected to the PCBA control board 404 to supply power for the PCBA control board 404, while the DC plug 500 is also electrically connected the wireless power supply coil 403 to supply power to the wireless power supply coil 403, enabling the wireless power supply coil 403 to generate a magnetic field.

In other embodiments (not shown), the base plate 103 is equipped with a rechargeable battery. The DC plug 500 is electrically connected to the battery, which in turn is connected to the PCBA control board 404 and the wireless power supply coil 403. When the DC plug 500 is not connected to an external power source, the battery supplies power to the PCBA control board 404 and the wireless power supply coil 403, allowing the lamp to provide illumination without an external power supply.

Figure 3:
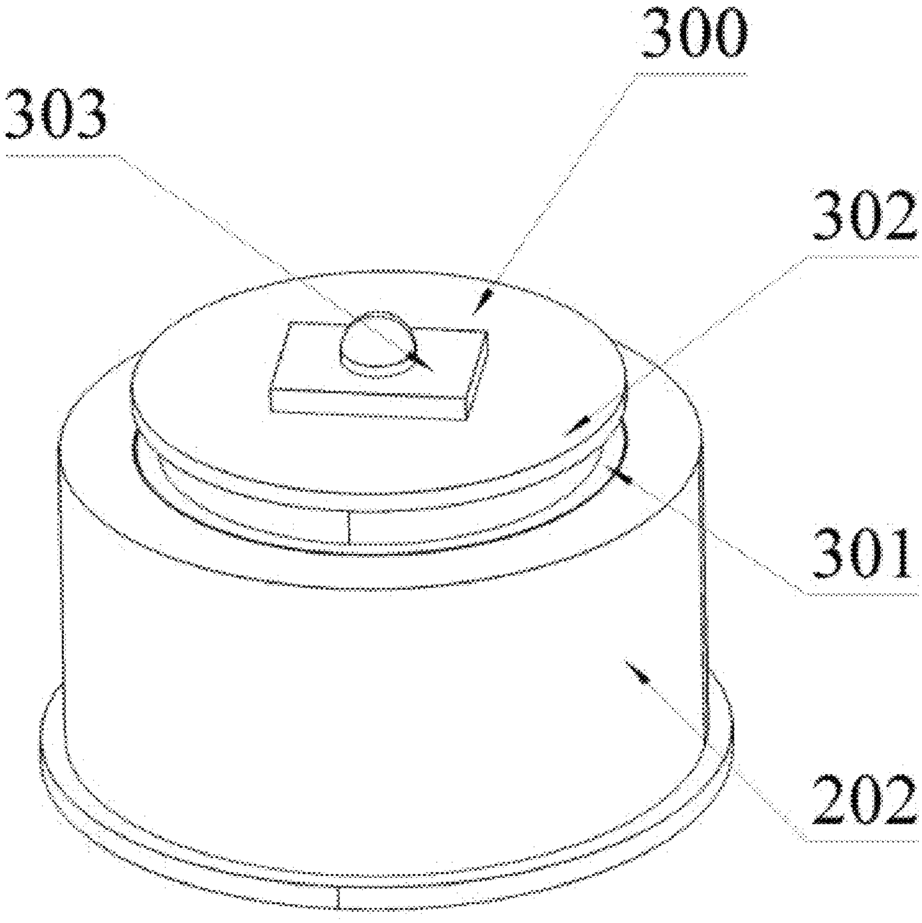
FIG. 3 is a structural schematic diagram of the lighting module in FIG. 2.

As shown in FIGS. 3 and 7, the lighting module 300 includes second magnets 301, a wireless receiving coil 302, and a light emitting unit, which is an LED light panel 303. The second magnet 301 is positioned at the top of the lamp base 202, the wireless receiving coil 302 is placed on top of the second magnet 301, and the LED light panel 303 is mounted on top of the wireless receiving coil 302. The N pole of the first magnet 402 faces the S pole of the second magnet 301. The PCBA control board 404 supplies current to the electromagnetic coil 401, driving the electromagnetic coil 401 to generate a magnetic field. This magnetic field exerts a repulsive force on the second magnets 301, positioning the second magnets 301 above the housing 100. Simultaneously, due to the opposite magnetic polarities of the first magnets 402 and the second magnets 301, the first magnets 402 attract the second magnets 301 downward, maintaining the balance of the lamp holder 200 and enabling it to stably levitate above the housing 100. When the wireless power supply coil 403 is energized, it generates a strong magnetic field, inducing a current in the wireless receiving coil 302, which powers the LED light panel 303, enabling the LED light panel 303 to emit light.

Here, the repulsive force generated by the electromagnetic coil 401 when energized forms a dynamic balance with the attractive force between the first magnets 402 and the second magnets 301, allowing the lamp holder 200 to stably levitate above the housing 100 at a height range of 5-20 mm. The PCBA control board 404 dynamically adjusts the levitation height and stability of the lamp holder 200 by regulating the current intensity supplied to the electromagnetic coil 401. The axial center lines of the wireless power supply coil 403 and the wireless receiving coil 302 coincide, and their spacing is less than 2 cm to optimize electromagnetic induction efficiency.

In other embodiments (not shown), the housing 100 contains a levitation driving unit and a wireless power supply transmitting unit; the lamp holder 200 of the levitating body is provided with a levitation responding unit, a wireless power supply receiving unit and a light emitting unit. The levitation driving unit and the levitation responding unit interact magnetically to generate levitation force, enabling the levitating body to stably levitate above the housing 100. The wireless power supply transmitting unit and the wireless power supply receiving unit couple through electromagnetic induction to supply power to the light emitting unit.

In other embodiments (not shown), the housing 100 adopts a flat hexagonal design, with the outer shell 101 made of frosted translucent acrylic. The top cover 102 is a transparent glass plate, with a wireless power supply coil 403 fixed beneath the central area. The lamp holder 200 is designed as a flat, faceted diamond-shaped crystal-like floating body, composed of a lamp shell 201 made of transparent or translucent material (such as glass or crystal resin) and a lamp base 202 containing the lighting module 300, bonded together with a sealant. The LED light panel 303 in the lighting module 300 includes RGB multi-color LED chips and a simple control circuit. The flat hexagonal housing 100 provides a more modern and stable visual appeal, while the frosted outer shell 101 softens the light from internal electronic components. When floating, the crystal-like lamp holder 200 refracts and reflects LED light through its faceted cuts, creating a dazzling starlight effect. The RGB LEDs can be preset through the PCBA control board 404 or switched between color and brightness modes (such as monochrome, gradient, or candlelight flicker simulation) using a simple external controller (e.g., infrared remote), significantly enhancing ambiance creation. While retaining core floating and wireless power functions, the product's decorative appeal and ambiance versatility are greatly improved through unique geometric forms and multi-color LEDs, making it suitable for modern homes, boutiques, and similar settings.

In other embodiments (not shown), the base plate 103 is enlarged, integrating a wireless charging transmitter module compliant with Qi or other mainstream standards onto the PCBA control board 404. The upper surface of the base plate 103 (outside the floating area) features a clearly marked wireless charging zone. The shape of the top cover 102 is adjusted accordingly to ensure the floating function remains unaffected. The lighting module 300 remains unchanged. When a wireless charging-compatible device (e.g., a phone or headphones) is placed on the designated wireless charging area of the base, the integrated wireless charging transmitter module activates, charging these devices through electromagnetic induction. The PCBA control board 404 coordinates power distribution and management between floating power supply and wireless charging, prioritizing floating stability.

In other embodiments (not shown), on the PCBA control board 404, the electromagnetic coils 401 are no longer uniformly arranged but are instead designed as tilted or circular arrays at specific angles, and their driving current is controllably variable-frequency (implemented by dedicated control circuits on the PCBA). The arrangement of the first magnets 402 is correspondingly designed. Accordingly, the second magnets 301 at the bottom of the lamp base 202 are also designed with a specific shape or polarity distribution (such as a ring magnet or specific polarity arrangement) to interact with the magnetic field of the electromagnetic coils 401. The surface of the top cover 102 can be designed with subtle light-guiding textures or patterns. The core levitation principle remains unchanged, utilizing the balance of magnetic repulsion and attractive force to achieve levitation. The key point is that the PCBA control board 404, by precisely controlling the current magnitude, direction, and frequency of the electromagnetic coils 401 at different positions, generates a slight, continuous rotational torque in the horizontal direction while maintaining the levitation force. This torque overcomes minor friction and air resistance, driving the levitating lamp holder 200 to rotate slowly and smoothly. The rotating lamp holder 200 causes the LED light inside it to project dynamically changing light and shadow effects through the lamp shell 201 (or combined with the textures of the top cover 102), simulating flickering candlelight or creating unique dynamic halos. On the basis of stable levitation, the elegant rotational motion is added, creating dynamic light and shadow artistic effects, greatly enhancing the product's visual appeal and interestingness, making it a more attractive desktop art piece. The levitating decorative lamp is ingeniously integrated with the practical functionality of a wireless phone charger, saving desktop space and increasing the product's practical value. The DC plug 500 provides power once, simultaneously meeting the lighting needs of the levitating lamp and the charging requirements of mobile devices.

In other embodiments (not shown), the PCBA control board 404 integrates a plurality of independent levitation control channels, corresponding to a plurality of (e.g., 2-4) levitation zones. Below each levitation zone, there is an independent set of electromagnetic coils 401 and an array of first magnets 402 (part of the power supply module 400), along with corresponding wireless power supply coils 403 (which can be controlled independently or in groups). The top cover 102 covers the entire platform, with transparent windows corresponding to each levitation zone. The lamp holder 200 is designed as a miniaturized, standardized interface module (e.g., smaller teardrop, spherical, or cylindrical shapes), each containing a complete lighting module 300 (second magnets 301, wireless receiving coil 302, LED light panel 303). Each compact lamp holder 200 levitates independently above its corresponding base zone without interference. The PCBA control board 404 can control the on/off and brightness (if the LED is dimmable) of each levitation point, and even enable simple group control (e.g., simultaneous on/off, alternating flashing). Users can select and combine lamp holders 200 of different shapes or colors according to preference, placing them on any levitation point of the platform, achieving modularity and customization. Users can freely assemble a plurality of levitating light sources based on scene requirements, creating richer layers of light and shadow or decorative effects (e.g., simulating constellations or forming arrays). The platform design also provides greater creative flexibility.

In other embodiments (not shown), within the cavity of the housing 100, a rechargeable backup battery (such as a lithium-ion battery) is added in the space below or beside the connecting plate 104. The PCBA control board 404 integrates a battery management system (BMS) and a power switching circuit. The DC plug 500 not only supplies power to the system and charges the battery but also has its connection status monitored by the PCBA. The LED light panel 303 of the lighting module 300 can use low-power, high-brightness LEDs. A simple physical switch or touch switch can be added to the base plate 103 or outer shell 101 for manually turning on/off/switching modes. When the DC plug 500 is connected to an external power source, the system operates normally (levitation and illumination), while the BMS manages charging the backup battery. When the external power is disconnected (e.g., during a power outage), the power switching circuit automatically and seamlessly switches to the backup battery. In battery mode: the PCBA control board 404 can reduce the drive current of the electromagnetic coil 401 to the minimum level required to maintain basic levitation (possibly sacrificing some levitation height or stability redundancy) and significantly dim the LED light panel 303 or switch to a specific low-power mode (e.g., lighting only a few LEDs or switching to a breathing/flashing mode as a signal). Alternatively, through the switch, users can choose to light only the LEDs without maintaining levitation (further saving power) or turn off levitation while retaining lighting with minimal brightness. Beyond its core decorative function, a practical emergency lighting function is added. During sudden power outages, it automatically lights up and provides hours (depending on battery capacity and power consumption) of soft lighting, combining safety and utility. Normally, it serves as a decorative light.

In summary, the present disclosure achieves the following technical effects:

When the DC plug 500 is connected to an external power source, the PCBA control board 404 supplies current to the electromagnetic coils 401, driving the electromagnetic coils 401 to generate a magnetic field. This field provides a repulsive force to the second magnets 301, positioning the second magnets 301 above the housing 100. Simultaneously, due to the opposite magnetic poles of the first magnets 402 and the second magnets 301, the first magnets 402 attract the second magnets 301 downward, maintaining the balance of the lamp holder 200 and enabling it to stably levitate above the housing 100. Moreover, when the wireless power supply coil 403 is energized, it generates a strong magnetic field, inducing a current in the wireless receiving coil 302. This current powers the LED light panel 303, enabling the LED light panel 303 to emit light.

In the description of the present disclosure, it should be appreciated that directional terms such as "front, rear, up, down, left, right", "horizontal, vertical, perpendicular, horizontal" and "top, bottom" etc. indicate the orientation or positional relationship based on the orientation or positional relationship shown in the drawings, and are only for the convenience of describing the present disclosure and simplifying the description. In the absence of a contrary explanation, these directional terms do not indicate or imply that the device or element referred to must have a specific orientation or be constructed and operated in a specific orientation, and therefore should not be understood as limiting the scope of protection of the present disclosure; the directional terms "inside, outside" refer to the inside and outside relative to the contour of each component itself.

For the convenience of description, spatial relative terms such as "on . . . ", "above . . . ", "on the upper surface of . . . ", "upper" etc. may be used here to describe the spatial positional relationship of a device or feature with other devices or features as shown in the drawings. It should be appreciated that spatial relative terms are intended to encompass different orientations of the device in use or operation other than the orientation described in the drawings. For example, if the device in the drawing is inverted, the device described as "above other devices or structures" or "on other devices or structures" will subsequently be positioned as "below other devices or structures" or "under other devices or structures". Thus, the exemplary term "above" can include both "above" and "below" orientations. The device can also be positioned in other different ways (rotated 90 degrees or in other orientations), and the spatial relative descriptions used here should be interpreted accordingly.

In addition, it should be noted that the use of terms such as "first", "second" etc. to define components is for the convenience of distinguishing the corresponding components. Unless otherwise stated, the above terms have no special meaning, and therefore should not be understood as limiting the scope of protection of the present disclosure.

The above description is only a preferred embodiment of the present disclosure and is not intended to limit the present disclosure. For those skilled in the art, the present disclosure can have various modifications and changes. Any modifications, equivalent replacements, improvements etc. made within the spirit and principles of the present disclosure should be included within the scope of protection of the present disclosure.

What is claimed is:

1. A lighting fixture with a levitation function, comprising:

a housing internally equipped with a power supply module, the power supply module comprising a magnetic field generating unit and a wireless power supply transmitting unit, wherein the housing comprises an outer shell, a top cover, and a base plate, and the housing forms a sealed cavity composed of the outer shell, the top cover embedded at a top and a detachable base plate at a bottom, wherein the sealed cavity is horizontally provided with a connecting plate fixed to an inner wall of the outer shell; and a lamp holder internally equipped with a lighting module, the lighting module comprising a magnetic field responding unit, a wireless power supply receiving unit and a light emitting unit;

wherein the magnetic field generating unit comprises at least one electromagnetic coil and at least one first magnet, and the magnetic field responding unit comprises at least one second magnet; when the at least one electromagnetic coil is energized, a magnetic field is generated to provides a repulsive force to the at least one second magnet, and the at least one first magnet and the at least one second magnet have opposite magnetic poles, providing an attractive force, thereby enabling the lamp holder to levitate above the housing and maintain balance;

wherein the wireless power supply transmitting unit comprises a wireless power supply coil, the wireless power supply receiving unit comprises a wireless receiving coil, and the wireless power supply coil and the wireless receiving coil are coupled through electromagnetic induction to supply power to the light emitting unit.

2. The lighting fixture with a levitation function according to claim 1, wherein the lighting fixture further comprises a DC plug, the housing is internally provided with the power supply module, and the base plate has a mounting groove, wherein the DC plug is installed through the mounting groove and is connected to an external power source to supply power to the power supply module.

3. The lighting fixture with a levitation function according to claim 1, wherein the lamp holder comprises a hollow lamp shell and a lamp base, and the lamp shell and the lamp base are connected by snap-fit to form a water droplet-shaped levitating body.

4. The lighting fixture with a levitation function according to claim 2, wherein the power supply module comprises a PCBA control board, on which the at least one electromagnetic coil and the at least one first magnet are uniformly arranged, and the wireless power supply coil is fixed to a bottom of the top cover.

5. The lighting fixture with a levitation function according to claim 4, wherein the DC plug is electrically connected to the PCBA control board and the wireless power supply coil, supplying power to the at least one electromagnetic coil and the wireless power supply coil respectively.

6. The lighting fixture with a levitation function according to claim 3, wherein the at least one second magnet is arranged at a top of the lamp base, the wireless receiving coil is stacked on top of the at least one second magnet, and the light emitting unit is stacked on top of the wireless receiving coil.

7. The lighting fixture with a levitation function according to claim 6, wherein the light emitting unit is an LED light panel, which is powered by current induced by the wireless receiving coil to emit light.

8. The lighting fixture with a levitation function according to claim 1, wherein the repulsive force generated by energization of the at least one electromagnetic coil and the attractive force between the at least one first magnet and the at least one second magnet form a dynamic balance, enabling the lamp holder to stably levitate above the housing at a height range of 5-20 mm.

9. The lighting fixture with a levitation function according to claim 4, wherein the PCBA control board dynamically adjusts a levitation height and stability of the lamp holder by regulating a current intensity input to the at least one electromagnetic coil.

10. A lighting fixture with a levitation function, comprising:

a housing internally equipped with a power supply module, the power supply module comprising a magnetic field generating unit and a wireless power supply transmitting unit; and a lamp holder internally equipped with a lighting module, the lighting module comprising a magnetic field responding unit, a wireless power supply receiving unit and a light emitting unit;

wherein the magnetic field generating unit comprises at least one electromagnetic coil and at least one first magnet, and the magnetic field responding unit comprises at least one second magnet; when the at least one electromagnetic coil is energized, a magnetic field is generated to provides a repulsive force to the at least one second magnet, and the at least one first magnet and the at least one second magnet have opposite magnetic poles, providing an attractive force, thereby enabling the lamp holder to levitate above the housing and maintain balance;

wherein the wireless power supply transmitting unit comprises a wireless power supply coil, the wireless power supply receiving unit comprises a wireless receiving coil, and the wireless power supply coil and the wireless receiving coil are coupled through electromagnetic induction to supply power to the light emitting unit;

wherein axial center lines of the wireless power supply coil and the wireless receiving coil coincide, and a distance therebetween is less than 2 cm to optimize an electromagnetic induction efficiency.

11. A lighting fixture with a levitation function, comprising:

a housing internally equipped with a power supply module, the power supply module comprising a magnetic field generating unit and a wireless power supply transmitting unit; and a lamp holder internally equipped with a lighting module, the lighting module comprising a magnetic field responding unit, a wireless power supply receiving unit and a light emitting unit;

wherein the housing is cylindrical, the lamp holder is teardrop-shaped, and a maximum outer diameter of the lamp holder is smaller than an outer diameter of the housing;

wherein the magnetic field generating unit comprises at least one electromagnetic coil and at least one first magnet, and the magnetic field responding unit comprises at least one second magnet; when the at least one electromagnetic coil is energized, a magnetic field is generated to provide a repulsive force to the at least one second magnet, and the at least one first magnet and the at least one second magnet have opposite magnetic poles to provide an attractive force, thereby enabling the lamp holder to levitate above the housing and maintain balance;

wherein the wireless power supply transmitting unit and the wireless power supply receiving unit are coupled through electromagnetic induction to supply power to the light emitting unit.

12. The lighting fixture with a levitation function according to claim 11, wherein the lighting fixture further comprises a DC plug and a PCBA control board, the housing comprises a connecting plate, and the PCBA control board is arranged on the connecting plate.

13. The lighting fixture with a levitation function according to claim 12, wherein the DC plug is electrically connected to the PCBA control board, and the PCBA control board is electrically connected to the at least one electromagnetic coil for controlling magnitudes and directions of currents of the at least one electromagnetic coil.

14. The lighting fixture with a levitation function according to claim 11, wherein the light emitting unit is an LED light panel, the LED light panel is arranged on top of the wireless power supply receiving unit, and the LED light panel is electrically connected to the wireless power supply receiving unit.

15. The lighting fixture with a levitation function according to claim 12, wherein both the at least one electromagnetic coil and the at least one first magnet are arranged on the PCBA control board, the at least one second magnet is arranged inside the lamp holder, and the at least one electromagnetic coil is positioned opposite to the at least one second magnet.

16. The lighting fixture with a levitation function according to claim 12, wherein the housing further comprises a detachable base plate, the base plate is provided with a mounting groove for installing the DC plug, the DC plug is connected to an external power source to supply electricity to the power supply module.

17. The lighting fixture with a levitation function according to claim 11 wherein the lamp holder comprises a lamp shell and a lamp base, the lamp shell and the lamp base are connected by snap-fit, and a sealing ring is provided between the lamp shell and the lamp base to prevent dust and moisture from entering an interior of the lamp holder.

* * * * *